United States Patent
Hall et al.

(10) Patent No.: US 10,876,585 B2
(45) Date of Patent: Dec. 29, 2020

(54) PARKING BRAKE AND ANTI-THEFT APPARATUS FOR VENTED DISC BRAKES

(71) Applicants: David R. Hall, Provo, UT (US); Stephen R. Hall, Draper, UT (US); Jason Simpson, Provo, UT (US); Joe Fox, Spanish Fork, UT (US); Jedediah Knight, Provo, UT (US)

(72) Inventors: David R. Hall, Provo, UT (US); Stephen R. Hall, Draper, UT (US); Jason Simpson, Provo, UT (US); Joe Fox, Spanish Fork, UT (US); Jedediah Knight, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/681,914

(22) Filed: Aug. 21, 2017

(65) Prior Publication Data
US 2019/0056005 A1 Feb. 21, 2019

(51) Int. Cl.
| | |
|---|---|
| *F16D 65/18* | (2006.01) |
| *B60T 17/18* | (2006.01) |
| *F16D 69/02* | (2006.01) |
| *B60T 1/00* | (2006.01) |
| *B60T 1/06* | (2006.01) |
| *F16D 63/00* | (2006.01) |
| *B60R 25/09* | (2013.01) |
| *F16D 65/12* | (2006.01) |

(Continued)

(52) U.S. Cl.
CPC .............. *F16D 65/18* (2013.01); *B60R 25/09* (2013.01); *B60T 1/005* (2013.01); *B60T 1/06* (2013.01); *B60T 17/18* (2013.01); *F16D 63/006* (2013.01); *F16D 65/12* (2013.01); *F16D 69/02* (2013.01); *F16D 2065/1328* (2013.01); *F16D 2127/06* (2013.01); *F16D 2500/102* (2013.01)

(58) Field of Classification Search
CPC ...... F16D 65/18; F16D 69/02; F16D 2127/06; F16D 2500/102; F16D 65/12; F16D 63/006; F16D 2065/1328; B60T 17/18; B60T 1/005; B60T 1/06; B60R 25/09
See application file for complete search history.

(56) References Cited

U.S. PATENT DOCUMENTS

| | | | | |
|---|---|---|---|---|
| 3,642,100 | A | * | 2/1972 | Travis ..................... B60T 1/005 188/69 |
| 5,765,897 | A | * | 6/1998 | Snyder ................... B60J 3/0221 248/292.12 |

(Continued)

FOREIGN PATENT DOCUMENTS

DE 102004016510 A * 10/2005

*Primary Examiner* — Melody M Burch (57) ABSTRACT

Embodiments of a parking brake and anti-theft apparatus for a vented disc brake system are described herein. Such embodiments may include a brake assembly, an actuator and a rocker or a locking arm. The brake assembly by include a first and second rotor plates separated by spacers and slots. The rocker and locking arm may include pawls extending from an edge, and may be positioned adjacent to a circumference of the rotor plates, aligned between the rotor plates. The actuator may move the rocker and/or locking arm between locked an unlocked positions such that, in the locked configuration, the pawls are inserted into the slots, and in the unlocked configuration, the pawls are disposed outside the slots.

10 Claims, 14 Drawing Sheets

(51) Int. Cl.
*F16D 127/06* (2012.01)
*F16D 65/02* (2006.01)

(56) References Cited

U.S. PATENT DOCUMENTS

| | | | | |
|---|---|---|---|---|
| 5,860,407 | A | * | 1/1999 | Chapin et al. ..... F02M 21/0239 123/698 |
| 2006/0170282 | A1 | * | 8/2006 | Yamaguchi ........... B60T 13/746 303/20 |
| 2008/0222801 | A1 | * | 9/2008 | Harrow ................ A47C 19/005 5/1 |
| 2008/0269880 | A1 | * | 10/2008 | Jarvik ....................... F04D 3/00 623/3.13 |
| 2014/0305264 | A1 | * | 10/2014 | Dohogne .............. B25B 13/467 81/57 |
| 2015/0050197 | A1 | * | 2/2015 | Hintikka ............... B01L 3/0217 422/501 |

* cited by examiner

PARKING BRAKE AND ANTI-THEFT APPARATUS FOR VENTED DISC BRAKES

TECHNICAL FIELD

This invention relates generally to the automotive field and more specifically to parking brake and anti-theft systems.

BACKGROUND

Vehicles have many safety and anti-theft features. For example, many vehicles include parking brakes and electronic vehicle immobilizers. Such parking brakes typically include frictional braking assemblies, and transmission locks that prevent motion of the vehicle by engaging the drive mechanism with the transmission and preventing rotation of gears in the transmission. Immobilizers typically prevent operation of the vehicle electronic control unit without the presence of a recognized key. Other devices and apparatuses that move by rolling on wheels also include mechanical locking mechanisms that directly prevent the wheels from rolling by introducing an object that directly interferes with the rotation of the wheels, such as by introducing a fixed object in the path of rotation of a wheel-connected component.

SUMMARY OF THE INVENTION

Various improvements and adaptations are described herein regarding the systems described in the Background. For example, embodiments of a parking brake and anti-theft apparatus for an automobile are described herein, particularly regarding vented brake systems. Embodiments may include a brake assembly, an actuator and a rocker. The brake assembly may include a brake rotor having a first rotor plate. The brake assembly may include a second rotor plate. The brake assembly may include a plurality of spacers between the first and second rotor plates. The spacers may connect the first and second rotor plates. The brake assembly may include a plurality of slots between the spacers. The rocker may be coupled to the actuator. The rocker may be disposed adjacent to the circumference of the brake rotor. The rocker may include a pivot. The rocker may include at least two pawls. Each pawl may be disposed on an opposite side of the pivot from the other pawl. Each pawl may correspond to at least one of the plurality of slits. In a locked configuration, the pawls may be inserted into the slots between the first and second rotor plates. In an unlocked configuration, the one or more pawls may be disposed outside the slots. The actuator may move the rocker between the locked and unlocked configurations by adjusting a position of the rocker relative to the brake rotor.

Embodiments of the parking brake and anti-theft apparatus for an automobile may include a brake assembly, a locking arm, and an actuator. The brake assembly may include a first rotor plate. The brake assembly may include a second rotor plate. The brake assembly may include a plurality of spacers between the first and second rotor plates. The spacers may connect the first and second rotor plates. The brake assembly may include a plurality of slots between the spacers. The locking arm may be disposed adjacent to the circumference of the brake rotor. The locking arm may include a pivot disposed at a first distal end of the locking arm. The locking arm may include one or more pawls. The one or more pawls may correspond to one or more of the plurality of slots. In a locked configuration, the pawls may be inserted into the slots between the first and second rotor plates. In an unlocked configuration, the one or more pawls may be disposed outside the slots. The actuator may be coupled to the locking arm. The actuator may move the locking arm between the locked and unlocked configurations by adjusting a position of the locking arm relative to the brake rotor. The actuator may be coupled to the locking arm at a second distal end of the locking arm opposite the first distal end.

In some embodiments, the parking brake and anti-theft apparatus may further include a hardened lining over one or more of the pawls, over one or more of the spacers, over an interior surface of the first rotor plate, over an interior surface of the second rotor plate, or combinations thereof. The hardened lining may include one or more of tungsten carbide, cobalt, titanium dioxide, diamond, and silicon dioxide. The hardened lining may have a hardness greater than a hardness of one or more of the pawls, one or more of the spacers, an interior surface of the first rotor plate, an interior surface of the second rotor plate, or combinations thereof.

In some rocker embodiments, the actuator may be coupled to the rocker at the pivot. The actuator may include one or more of a solenoid, a spring, a hydraulic pump, a pneumatic pump, a motor, a screw, a cam, and a wedge. In some locking arm embodiments, the one or more pawls may be disposed along an edge of the locking arm adjacent to the brake rotor. The one or more pawls may be disposed between the first and second distal ends of the locking arm.

In some embodiments, the pawls may each include a shape complementary to the corresponding slots.

In some embodiments, the apparatus may be installed on a vehicle. An electronic control unit (ECU) of the vehicle may signal the actuator to mover the rocker to the unlocked configuration as the ECU detects authorized use of the vehicle.

In some embodiments, the parking brake and anti-theft apparatus may further include a position sensor. The position sensor may be coupled to one or more of the actuator and the rocker. The position sensor may detect a position of the rocker relative to the actuator, the brake rotor, or both. The apparatus may be installed on a vehicle. An ECU of the vehicle may store and execute instructions to cause rotation of the brake rotor, adjustment of a circumferential position of the rocker, or both, to align the pawls with the corresponding slots based on a position of the rocker detected by the position sensor.

BRIEF DESCRIPTION OF THE DRAWINGS

A more particular description of the apparatus summarized above is made below generally and by reference to specific embodiments. Several embodiments are depicted in drawings included with this application, in which.

DETAILED DESCRIPTION

A detailed description of embodiments of the apparatus summarized above and depicted in the appended figures is provided below by example, with reference to embodiments in the appended figures. Those of skill in the art will recognize that the features of the apparatus as described by example in the figures below could be arranged and designed in a variety of different configurations without departing from the scope of the claims. Thus, the detailed description below and the depictions of embodiments in the figures is representative of the apparatus described in the claims, and is not intended to limit the scope of the claims.

Figure 1:
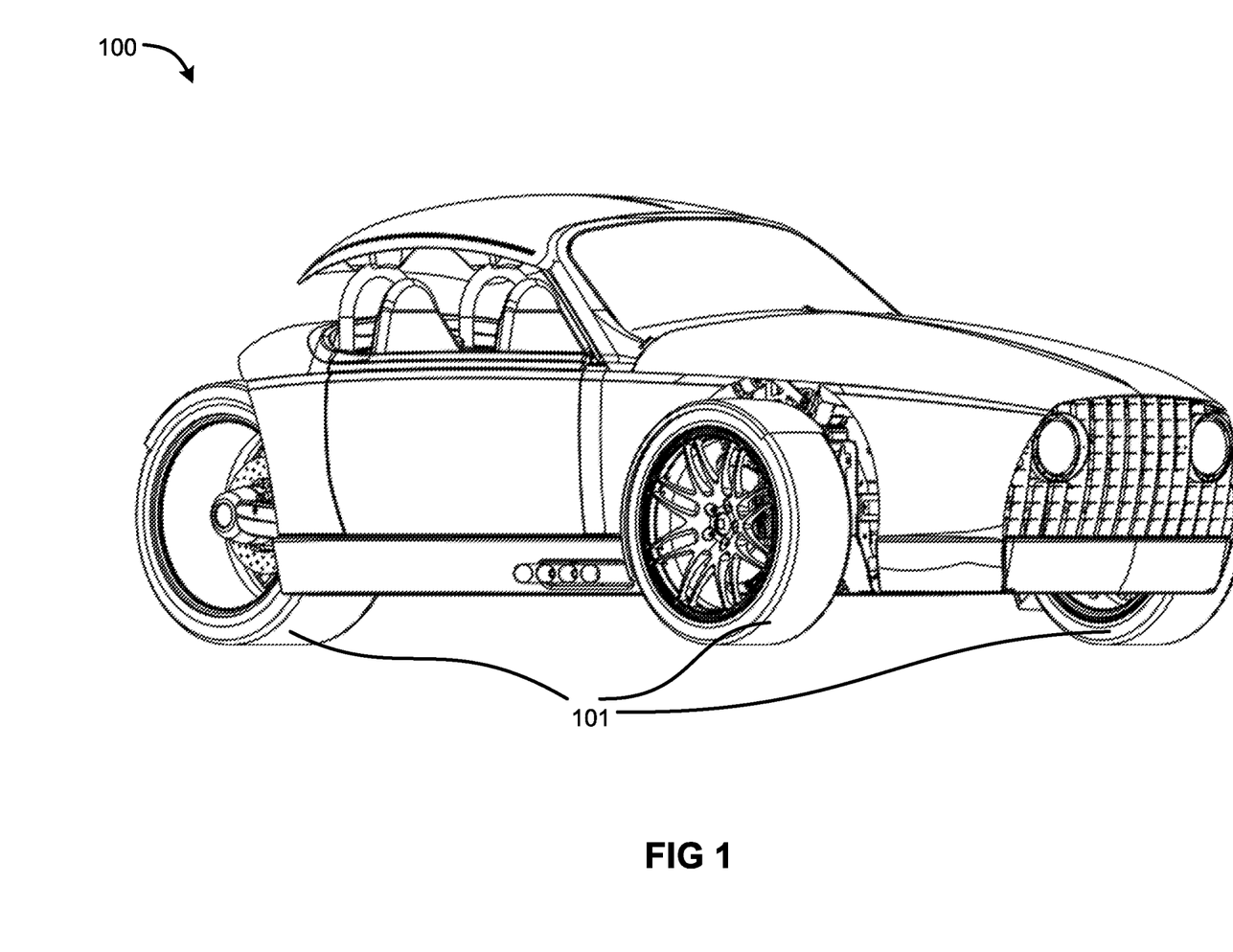
FIG. 1 depicts an isometric view of a vehicle on which the parking brake and anti-theft apparatus may be used.

FIG. 1 depicts an isometric view of a vehicle on which the parking brake and anti-theft apparatus described herein may be used. The vehicle 100 includes three wheels 101. The parking brake and anti-theft apparatus as described herein may correspond to one or more of the wheels 101. Though depicted as a three-wheeled vehicle, the vehicle 100 may be any of a variety of wheeled vehicles, including two-wheeled vehicles, four-wheeled vehicles, and, in some embodiments, any of a variety of tracked vehicles.

Figure 2A:
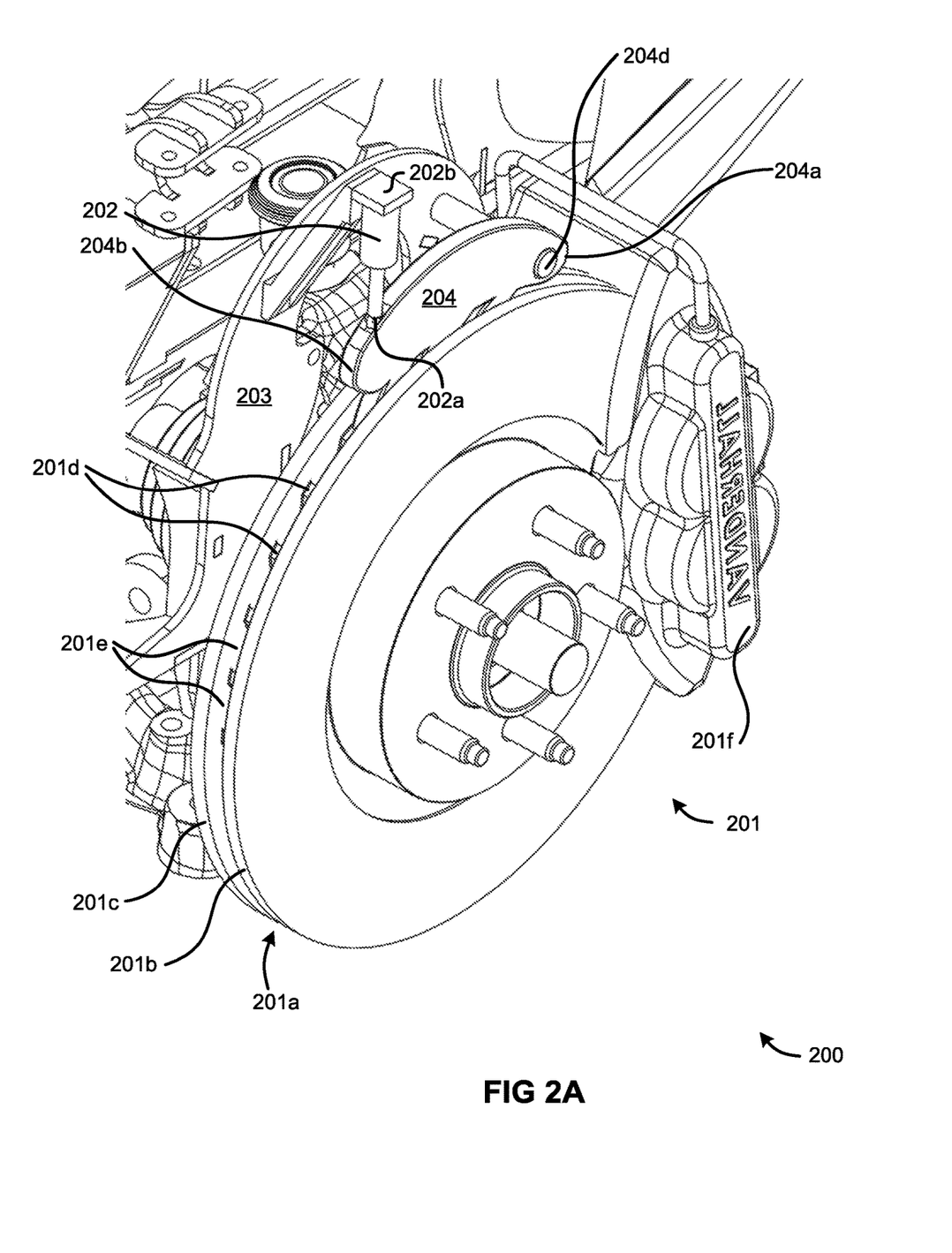
FIG. 2A depicts an isometric view of a first parking brake and anti-theft apparatus embodiment.

FIG. 2A depicts an isometric view of a first parking brake and anti-theft apparatus embodiment. The apparatus 200 includes a brake assembly 201, an actuator 202, a brake assembly frame 203, and a locking arm 204. The brake assembly includes a brake rotor 201a having a first rotor plate 201b and a second rotor plate 201c; a plurality of spacers 201d; a plurality of slots 201e between the spacers 201d; and a brake caliper 201f. The actuator 202 includes a first end 202a and a second end 202b. The locking arm includes a first distal end 204a, a second distal end 204b opposite the first distal end 204a, pawls 204c, and a pivot 204d.

Figure 2B:
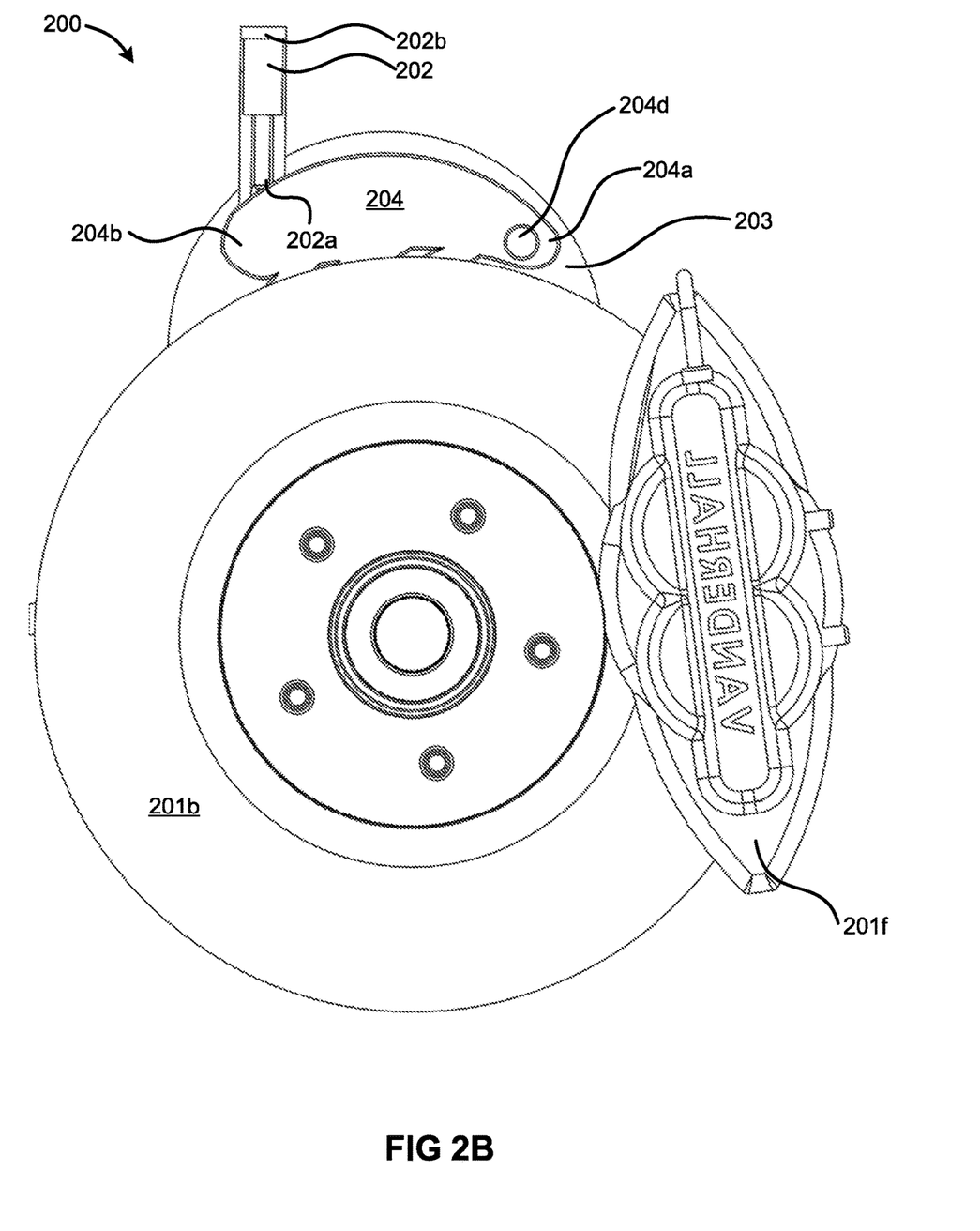
FIG. 2B depicts a side view of a first parking brake and anti-theft apparatus embodiment.

FIG. 2B depicts a side view of the first parking brake and anti-theft apparatus embodiment depicted in FIG. 2A. The depiction of the apparatus 200 includes various of the brake assembly components, the actuator 202, the brake assembly frame 203, and the locking arm 204. The brake assembly includes the first rotor plate 201b and the brake caliper 201f. The actuator 202 includes the first end 202a and the second end 202b. The locking arm includes the first distal end 204a, the second distal end 204b opposite the first distal end 204a, and the pivot 204d.

Figure 2C:
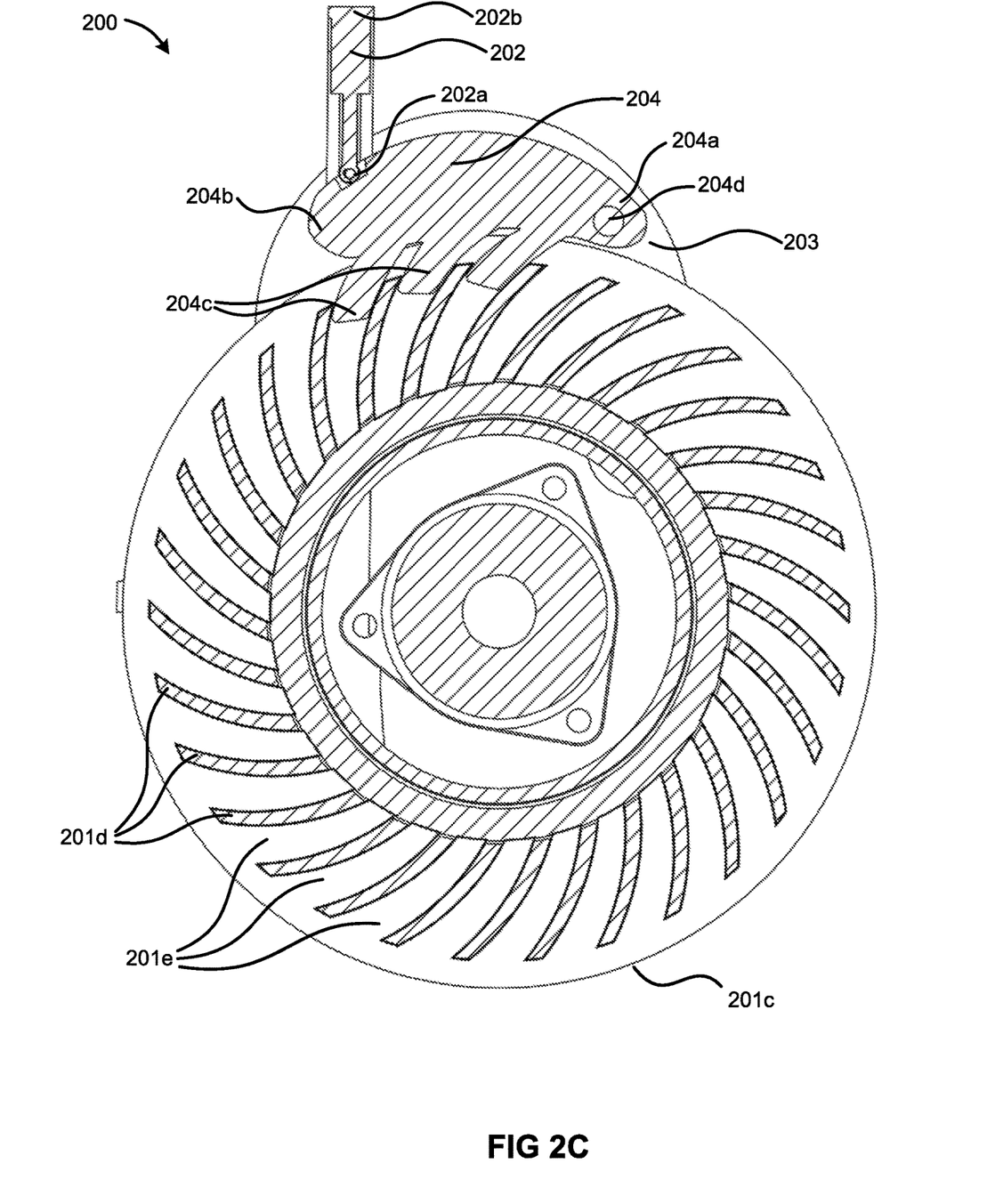
FIG. 2C depicts a cross-sectional view of a first parking brake and anti-theft apparatus embodiment.

FIG. 2C depicts a cross-sectional view of the first parking brake and anti-theft apparatus embodiment depicted in FIGS. 2A-B. The depiction of the apparatus 200 includes various of the brake assembly components, the actuator 202, the brake assembly frame 203, and the locking arm 204. The brake assembly includes the second rotor plate 201c, the plurality of spacers 201d, and the plurality of slots 201e between the spacers 201d. The locking arm includes the first distal end 204a, the second distal end 204b opposite the first distal end 204a, pawls 204c (not depicted in the previous two FIGs.), and the pivot 204d.

In some embodiments, such as that depicted, the apparatus 200 may increase the overall unsprung weight of the vehicle. However, in some embodiments, the apparatus 200 may be mounted to a swing arm, such as aligned with the pivot axis of the swing arm, or closer to the pivot axis than the wheel hub. The apparatus may extend from the swing arm to the rotor. Such placement may only add to the sprung weight of the vehicle, or may minimally add to the unsprung weight of the vehicle. For example, the apparatus 200 may be mounted to the spring arm of the rear wheel 101 of the vehicle 100 as depicted in FIG. 1.

The brake assembly 201 may be used to slow a vehicle as the vehicle is traveling. The caliper 201f may compress around the brake rotor 201a, creating contact between pads connected to the caliper 201f and the first and second rotor plates 201b,c. The brake rotor 201a may be circular, having a circumference defined by an outer edge of the brake rotor. The first and/or second rotor plate 201b,c may be composed of cast iron, steel, stainless steel, carbon, various metallic ceramics, or combinations thereof. The pads connected to the caliper 201f may be comprised of synthetic materials such as cellulose, aramid, polyacrylonitrile, and/or sintered glass; flaked metals such as copper, iron, and/or steel; graphite; clay; porcelain; phenol formaldehyde resin; cement; and/or combinations thereof and equivalents.

The spacers 201d may connect the first and second rotor plates 201b,c. The spacers 201d may additionally provide for heat dissipation during braking by increasing the surface area of the brake assembly 201 in contact with surrounding air. The spacers 201d may be formed as curved vanes, such as shown in FIG. 2C. The spacers 201d may be formed as straight vanes. The spacers 201d may be formed in a checkered or semi-checkered pattern. In general, a formation formed by the spacers 201d between the rotor plates 201b,c may be patterned, regular, or irregular. The spacers 201d may be formed of any one or more of the materials listed above for the rotor plates 201b,c and the caliper 201f. The slots 201e may correspond to the formation pattern of the spacers 201d, occupying the spaces between the spacers 201d. The spacers 201d and slots 201e may, in conjunction with the locking arm 204, prevent rotation of the brake rotor 201a.

The actuator 202 may be mounted to the brake assembly frame 203, which may in turn be mounted to a knuckle to which the brake rotor 201a rotatably mounts. Alternatively, the brake assembly frame 203 may be mounted to a swing arm as described above. As shown, the actuator 202 connects at a first end 202a pivotally to the locking arm 204, and connects at a second end 202b pivotally to the brake assembly frame 203. As depicted, the actuator 202 is a solenoid. However, in various embodiments, the actuator 202 may include any of a variety of linear actuators. Such actuators may include various components, including a spring, a hydraulic cylinder and pump, a pneumatic cylinder and pump, a motor, a screw, a cam, a wedge, or combinations thereof.

Coupled to, or incorporated with, the actuator 202 may be a position sensor, such as a potentiometer, a capacitive displacement sensor, a rotary encoder, or any of various equivalents. The position sensor may be a capacitive transducer, with at least a portion coupled to the locking arm 204, the brake assembly frame 203, the brake rotor 201a, or combinations thereof. The position sensor may detect a position of the locking arm 204 relative to the actuator 202, the brake rotor 201a, or both.

The brake assembly frame 203 may be mounted to a knuckle, which in turn may be connected to upper and lower control arms rotatably mounted to a vehicle frame. Various components of the brake assembly 201, including the brake rotor 201a, may be mounted to the knuckle, and various components, including the caliper 201f, may be mounted to the brake assembly frame 203. The brake assembly frame may be formed of iron, steel, aluminum, carbon steel, combinations thereof, or equivalents.

The locking arm 204 may be disposed adjacent to the circumference of the brake rotor 201a. The locking arm may be composed of any of a variety of materials, including iron, steel, other metal alloys and metal ceramics, combinations thereof, and equivalents. At the first distal end 204a, the pivot 204d may rotatably connect the locking arm 204 to the brake assembly frame 203. The actuator 202 may be rotatably connected to the second distal end 204b of the locking arm 204. The pawls 204c may extend from and/or be disposed along an edge of the locking arm 204 adjacent to the brake rotor 201a between the first and second distal ends 204a,b.

The pawls 204c may correspond to one or more of the slots 201e. The pawls 204c may extend into the slots 201e and press against the spacers 201d within the slots 201e to prevent rotation of the brake rotor 201a. The pawls 204c may be formed in a shape complementary to the corresponding slots 201e. For example, as shown, the slots 201e are curved, and the pawls 204c are complementarily curved. In some embodiments, the slots 201e may be straight, and the pawls 204c may be straight. In some embodiments, the slots 201e may be tapered along all sides, narrowing in width and depth, and the pawls 204c may be tapered in a complementary way. The spacers 201d may include one or more hooks that extend into the slots 201e, and the pawls 204c may include indentations corresponding to the hooks.

Figure 3A:
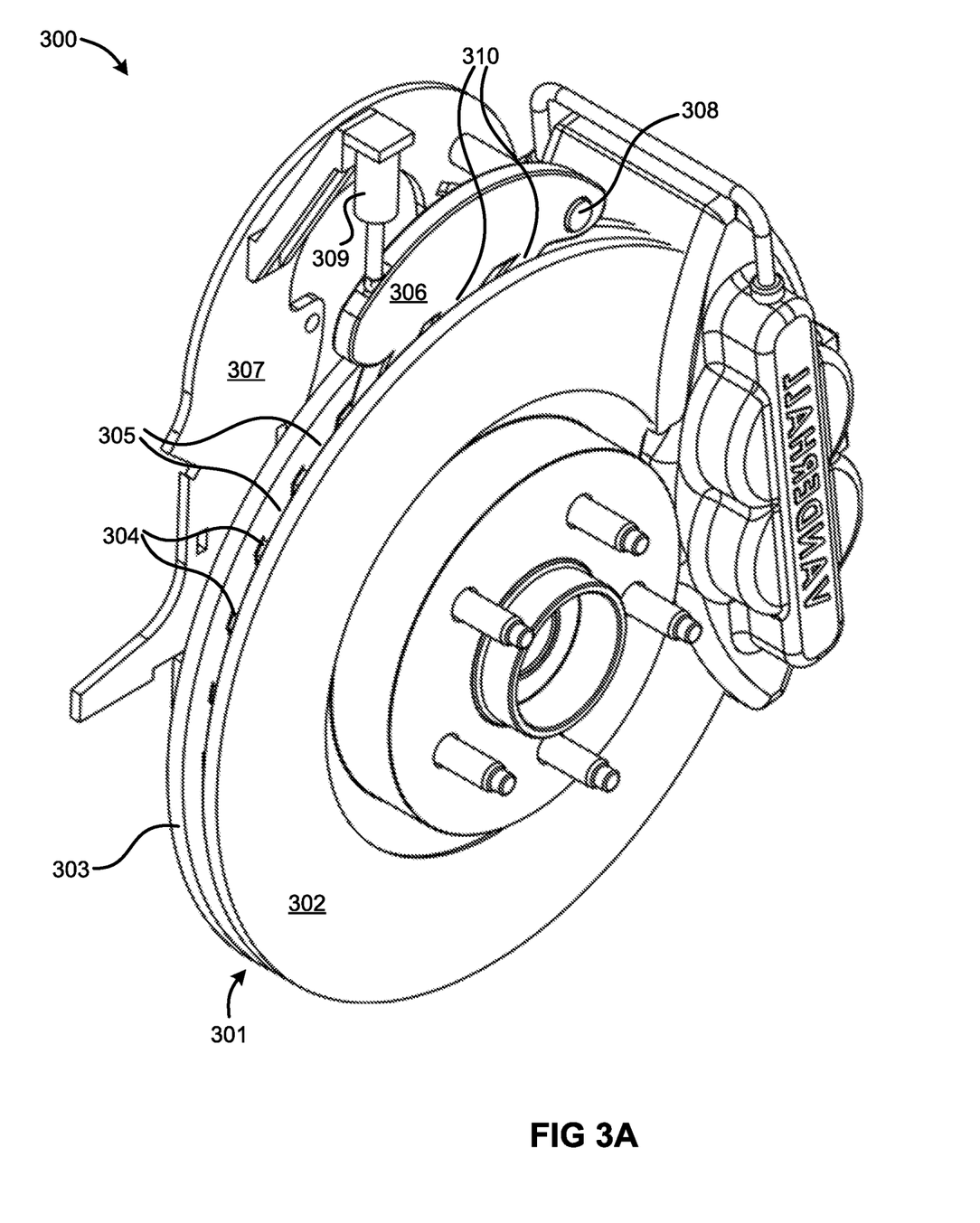
FIG. 3A depicts a locked configuration of the parking brake and anti-theft apparatus described regarding FIGS. 2A-C.

FIG. 3A depicts a locked configuration of the parking brake and anti-theft apparatus described regarding FIGS. 2A-C. The apparatus 300 includes a brake rotor 301 having a first plate 302, a second plate 303, spacers 304 and slots 305; a locking arm 306 connected to a brake assembly frame 307 by a pivot 308 and an actuator 309; and pawls 310 extending from the locking arm 306. As shown, in the locked configuration, the pawls 310 are inserted into the slots 305 between the first and second plates 302, 303.

Figure 3B:
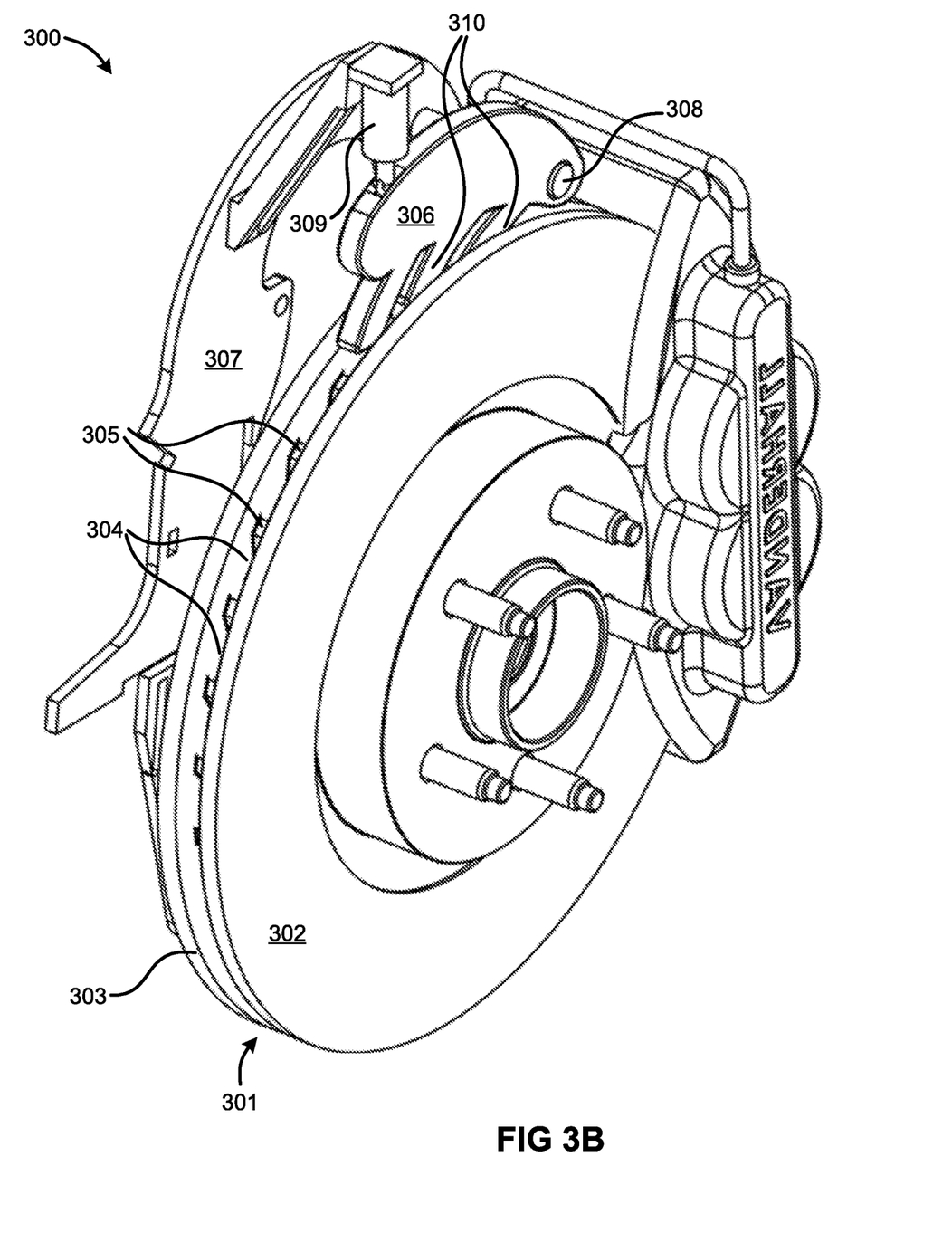
FIG. 3B depicts an unlocked configuration of the parking brake and anti-theft apparatus described regarding FIGS. 2A-C.

FIG. 3B depicts an unlocked configuration of the parking brake and anti-theft apparatus described regarding FIGS. 2A-C. As with FIG. 3A, the apparatus 300 includes the brake rotor 301 having the first plate 302, the second plate 303, spacers 304 and slots 305; the locking arm 306 connected to the brake assembly frame 307 by the pivot 308 and the actuator 309; and pawls 310 extending from the locking arm 306. In the unlocked configuration, the pawls 310 are disposed outside the slots 305.

The actuator 309 moves the locking arm 306 between the locked and unlocked configurations by adjusting a position of the locking arm 306 relative to the brake rotor 301. In the depicted embodiments, such adjustment entails raising and lowering the second distal end of the locking arm 306 and rotating the locking arm 306 about the pivot 308. In the locked configuration, the apparatus may act as a parking brake, preventing rotation of the brake rotor 301 without engaging a brake caliper to clamp onto the brake rotor 301.

Figure 4A:
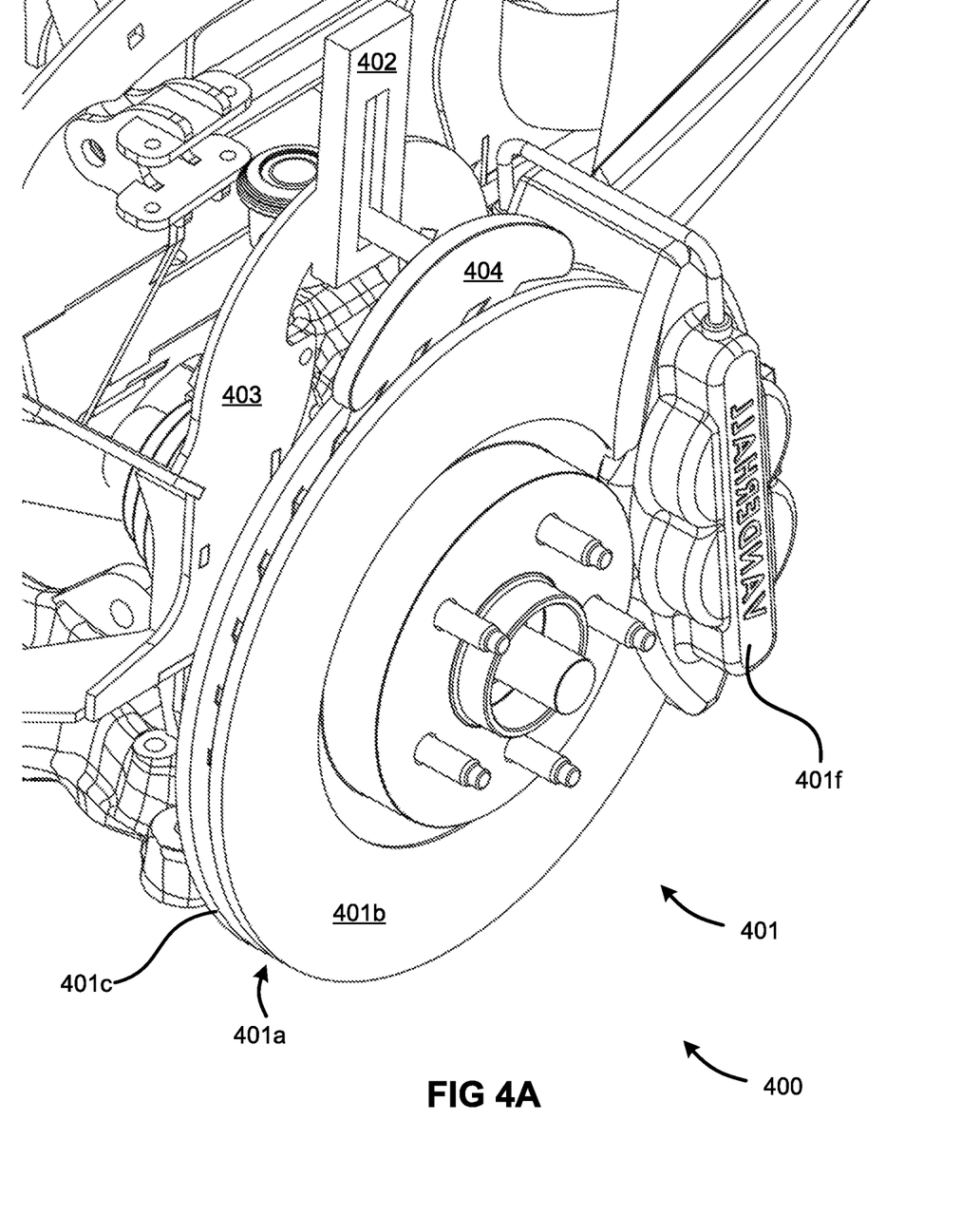
FIG. 4A depicts an isometric view of a second parking brake and anti-theft apparatus embodiment.

FIG. 4A depicts an isometric view of a second parking brake and anti-theft apparatus embodiment. The apparatus 400 includes a brake assembly 401, an actuator 402, a brake assembly frame 403, and a rocker 404. The brake assembly includes a brake rotor 401a having a first rotor plate 401b and a second rotor plate 401c; and a brake caliper 401f.

Figure 4B:
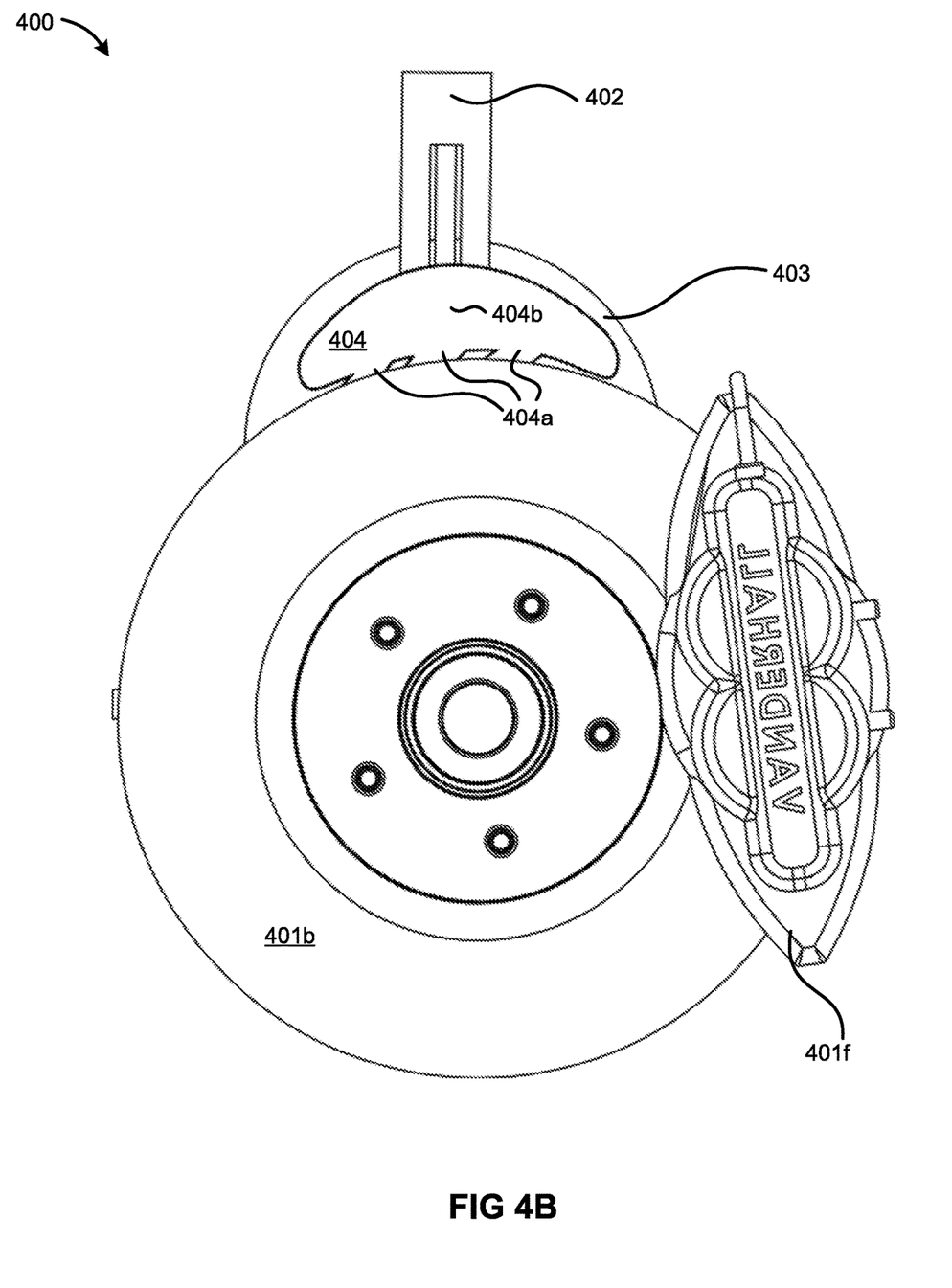
FIG. 4B depicts a side view of a second parking brake and anti-theft apparatus embodiment.

FIG. 4B depicts a side view of the second parking brake and anti-theft apparatus embodiment depicted in FIG. 4A. The apparatus 400 in the present depiction includes various of the brake assembly components, the actuator 402, the brake assembly frame 403, and the rocker 404. The brake assembly components depicted include the first rotor plate 401b and the brake caliper 401f. The present depiction of the rocker additionally includes pawls 404a, and a pivot point 404b about which the rocker 404 is rotatable.

Figure 4C:
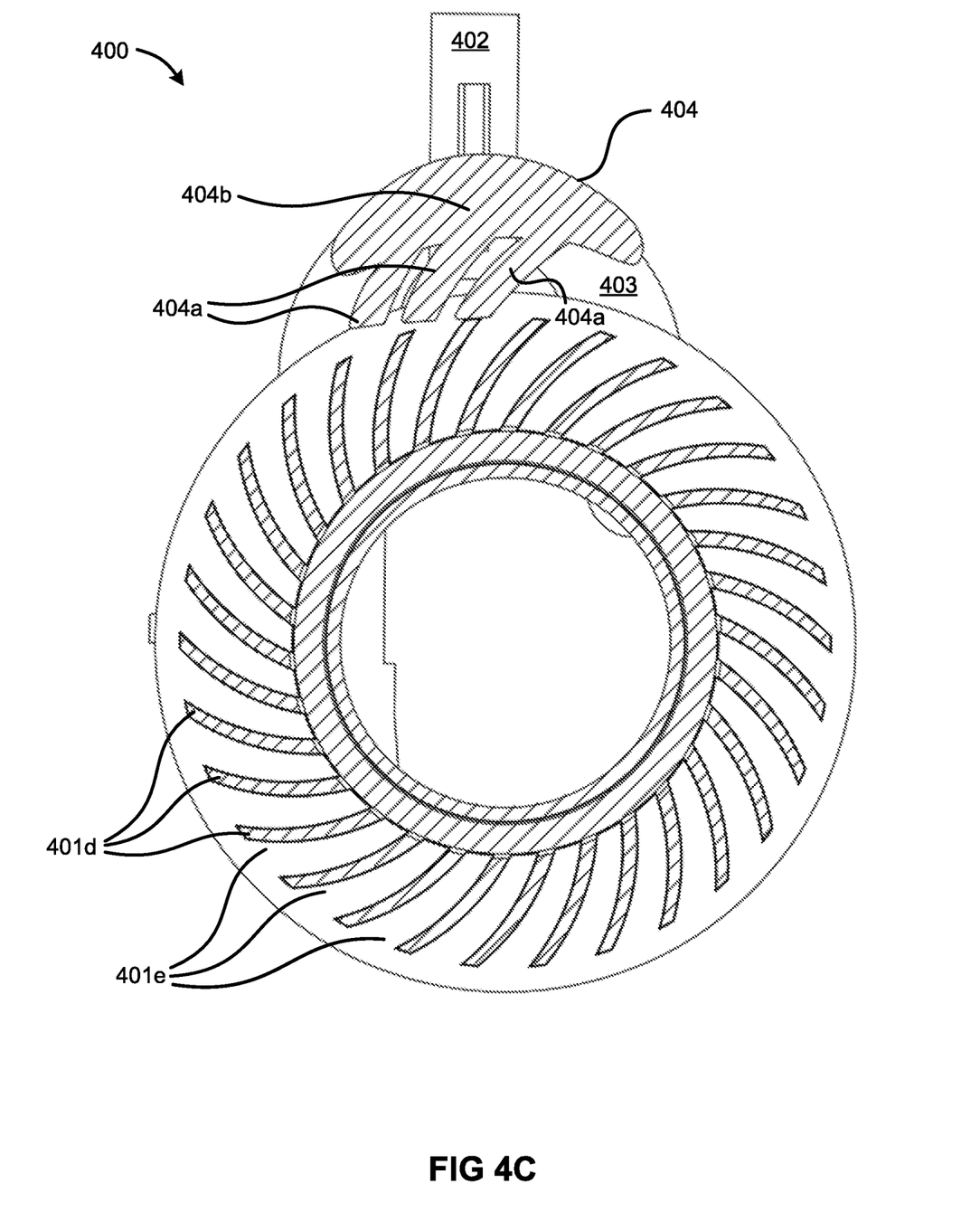
FIG. 4C depicts a cross-sectional view of a second parking brake and anti-theft apparatus embodiment.

FIG. 4C depicts an isometric view of the second parking brake and anti-theft apparatus embodiment depicted in FIGS. 4A-B. The present depiction of the apparatus 400 includes various of the brake assembly components, the actuator 402, the brake assembly frame 403, and the rocker 404. The brake assembly components depicted include a plurality of spacers 401d and a plurality of slots 401e between the spacers 401d. The rocker includes pawls 404a, and the pivot point 404b about which the rocker 404 is rotatable.

The brake assembly 401, actuator 402, and brake assembly frame 403 are similar to that described above regarding, and depicted in FIGS. 2A-C. The rocker 404 is coupled to the actuator 402 at the pivot 404b and is disposed adjacent to the circumference of the brake rotor 401. As depicted, the rocker 403 has three pawls 404a. Two pawls 404a are disposed on opposite sides of the pivot point 404b from each other, and one pawl 404a is aligned with the pivot point 404b. Each pawl 404a corresponds to at least one of the slots 401e. Each pawl 404a may have a shape complementary to the corresponding slots 401e. The rocker may prevent forward and reverse rotation of the brake rotor 401a by pivoting around the pivot 404b, pinning one or more of the pawls 404a against the spacers 401d within the slots 401e.

A position sensor may be integrated into, or coupled to, one or both of the actuator 402 and the rocker 404. The position sensor may be similar to that described regarding FIGS. 2A-C, and may detect a position of the rocker 404 relative to the actuator 402, the brake rotor 401a, or both.

Figure 5A:
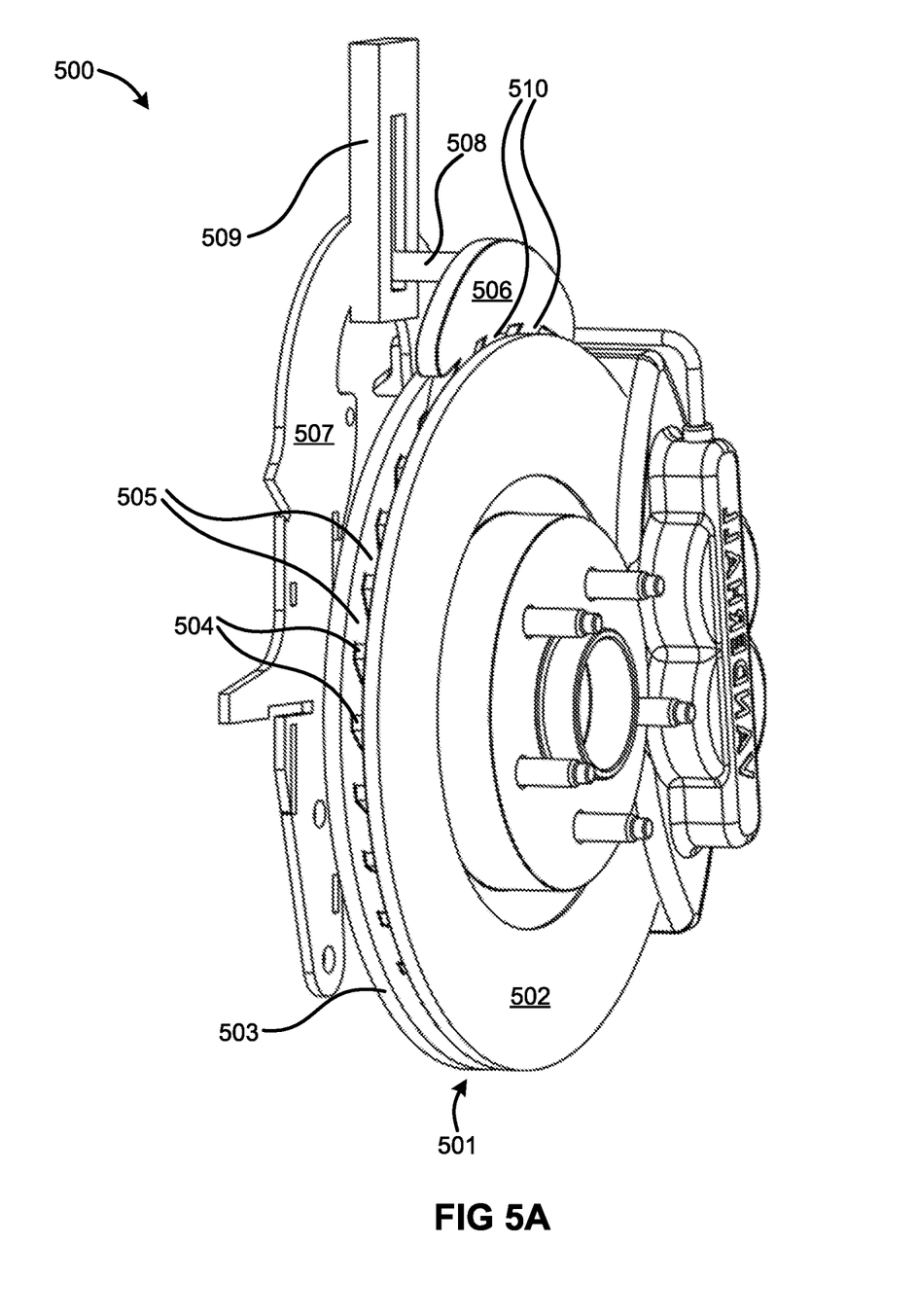
FIG. 5A depicts a locked configuration of the parking brake and anti-theft apparatus described regarding FIGS. 4A-C.

FIG. 5A depicts a locked configuration of the parking brake and anti-theft apparatus described regarding FIGS. 4A-C. The apparatus 500 includes a brake rotor 501 having a first plate 502, a second plate 503, spacers 504 and slots 505; a rocker 506 connected to a brake assembly frame 507 by a pivot 508 and an actuator 509; and pawls 510 extending from the rocker 506. In the locked configuration, the pawls 510 are inserted into the slots 505 between the first and second plates 502, 503.

Figure 5B:
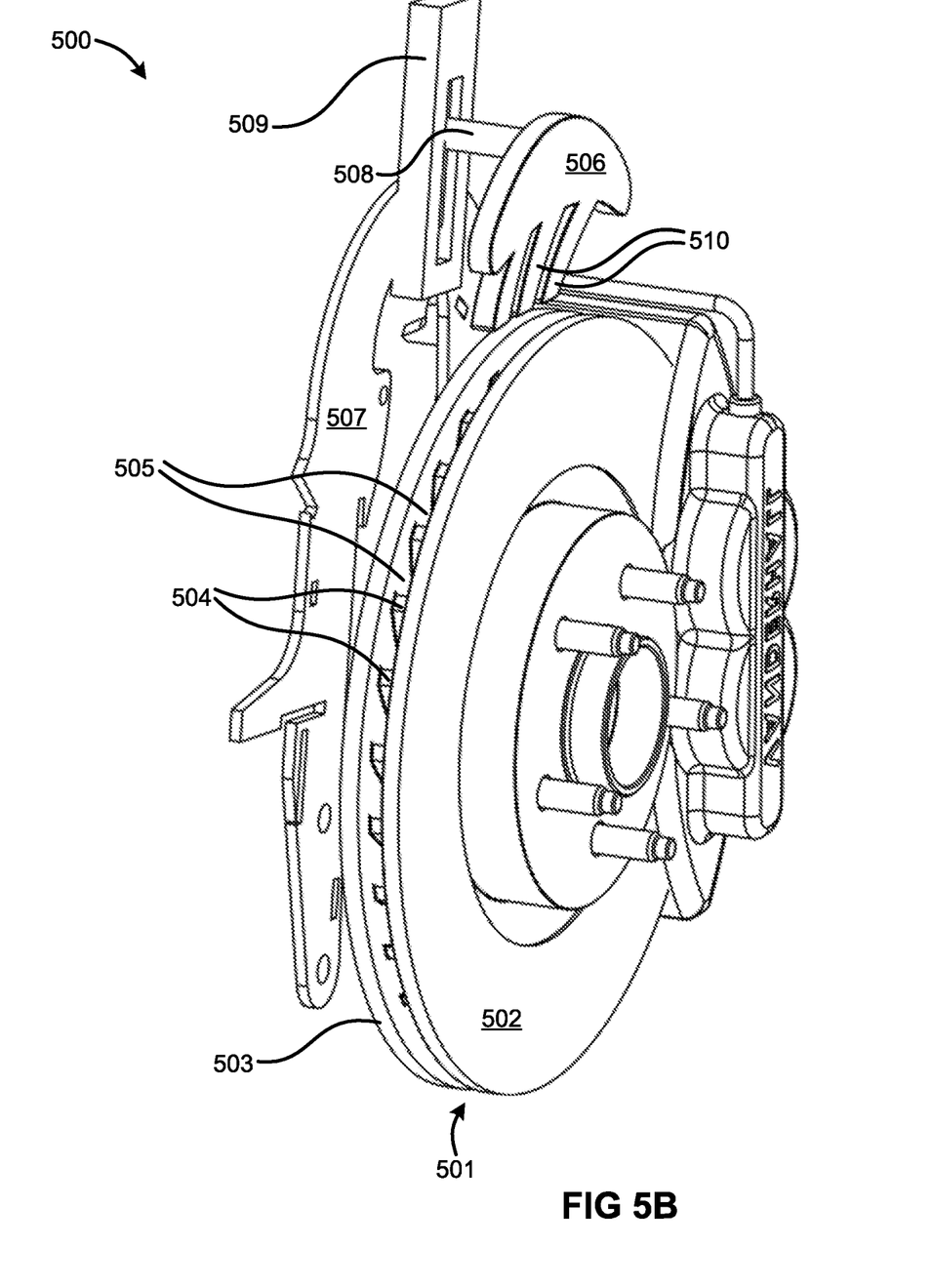
FIG. 5B depicts an unlocked configuration of the parking brake and anti-theft apparatus described regarding FIGS. 4A-C.

FIG. 5B depicts an unlocked configuration of the parking brake and anti-theft apparatus described regarding FIGS. 4A-C. As in FIG. 5A, the apparatus 500 includes the brake rotor 501 having the first plate 502, the second plate 503, spacers 504 and slots 505; the rocker 506 connected to the brake assembly frame 507 by the pivot 508 and the actuator 509; and pawls 510 extending from the rocker 506. In the unlocked configuration, the pawls 510 are disposed outside the slots 505.

The actuator 509 moves the rocker 506 between the locked and unlocked configurations by adjusting a position of the rocker 506 relative to the brake rotor 501. In the depicted embodiments, such adjustment entails raising and lowering the rocker 506. In the locked configuration, the apparatus may act as a parking brake, preventing rotation of the brake rotor 501 without engaging a brake caliper to clamp onto the brake rotor 501.

Figure 6:
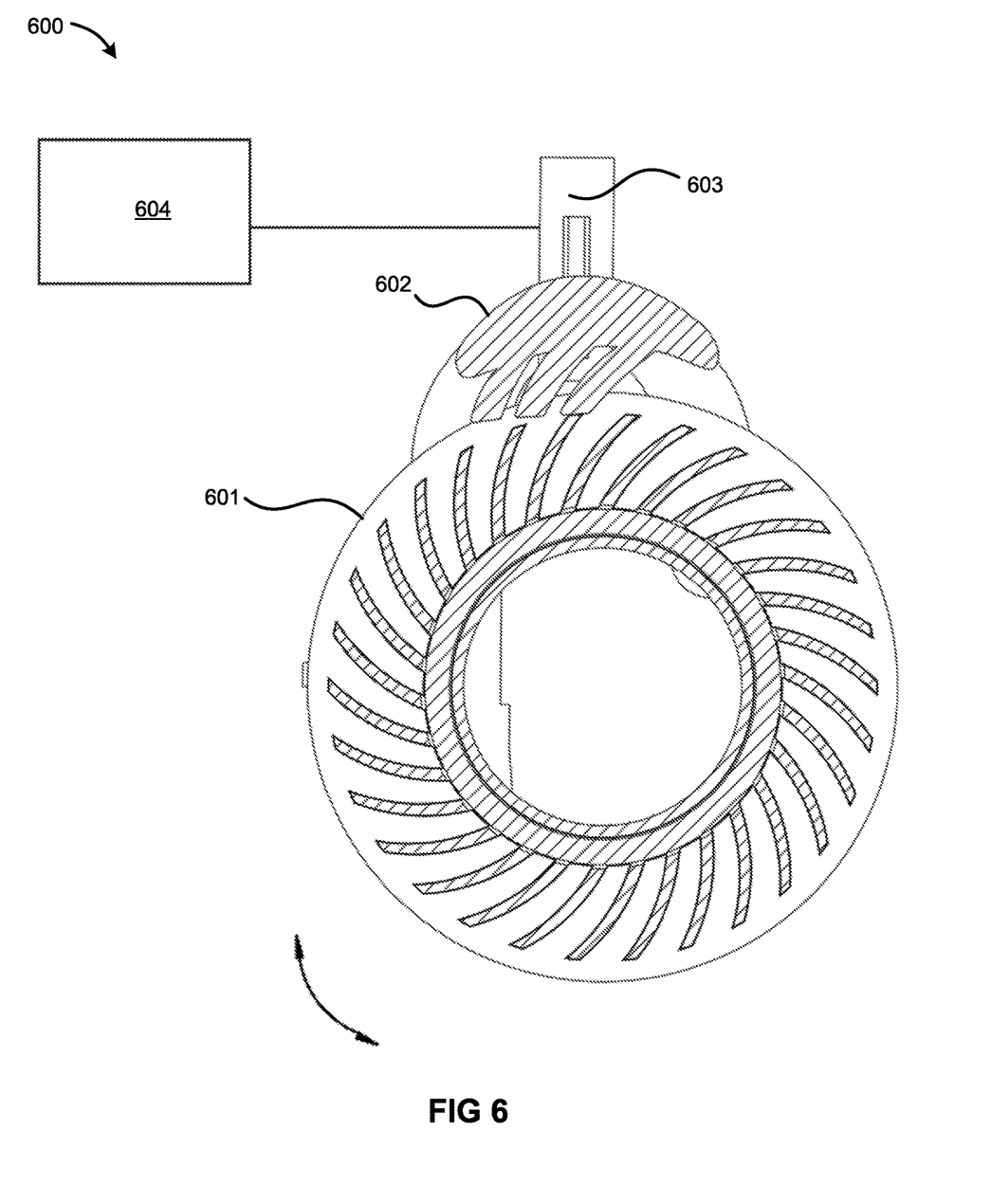
FIG. 6 depicts a parking brake and anti-theft apparatus connected to a vehicle electronic control unit (ECU)

FIG. 6 depicts a parking brake and anti-theft apparatus connected to a vehicle electronic control unit (ECU). The system 600 includes a brake rotor 601, a rocker 602 coupled to an actuator 603, and an ECU 604. The ECU 604 is electronically connected to the actuator 603, such as via a vehicle CAN bus. A position sensor may be coupled to or integrated with the actuator 603. The position sensor may be electronically connected to the ECU 604. The ECU stores instructions for operating the parking brake and anti-theft apparatus. For example, the ECU may store instructions to signal the actuator 603 to lower the rocker 602 into the locked configuration upon receiving a signal that a parking brake control was activated by a user. The ECU may store instructions to signal the actuator 603 to raise the rocker 602 into the unlocked configuration upon receiving a second signal that a parking brake control was deactivated by the user. The ECU may also store anti-theft instructions. The actuator 603 may have a default "locked" setting, wherein the rocker 602 is lowered into the locked configuration. The ECU 604 may listen for a passive or active RF key which indicates an authorized user of the vehicle is present in or near the vehicle. Upon receiving the key, the ECU 604 may signal the actuator 603 to raise the rocker 602. When the ECU 604 no longer detects the key, the ECU 604 may signal the actuator 604 to lower the rocker 602.

In some cases, as the actuator 603 lowers the rocker 602 to the locked configuration, the position of the rotor 601 may be such that the pawls extending from the rocker 602 are misaligned with the rotor 601 slots. The position sensor may detect the misalignment, such as be detecting incomplete extension of the actuator 603. The ECU 604 may store and execute instructions to cause rotation of the rotor 601 to align the pawls with the slots. For example, the rotor 601 may be rotated by an electric motor that rotates the rotor 601 at a rate slower than the detection and communication time required by the position sensor.

Figure 7A:
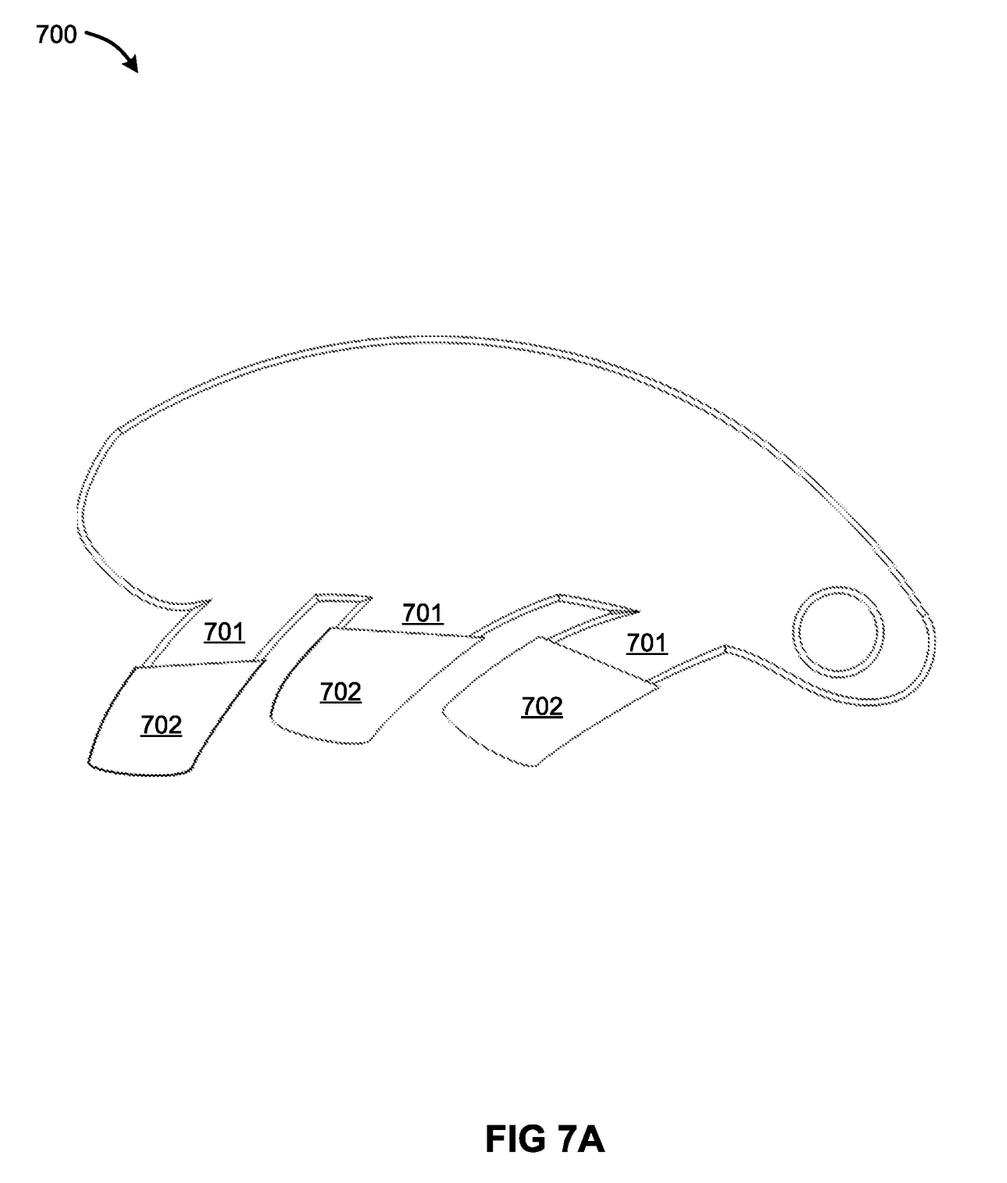
FIG. 7A depicts a side view of a locking arm embodiment.

FIG. 7A depicts a side view of a locking arm embodiment. The locking arm 700 includes pawls 701 with a hardened lining 702 over the pawls 701. The hardened lining has a hardness greater than a hardness of the pawls (or at least one or more of the pawls). For example, the pawls 701 may be formed of a steel having a Mohs hardness of 7, and the lining 702 may be formed of tungsten carbide having a Mohs hardness of 8. The lining 702 may be comprised of one or more materials, the combination of which has a net hardness greater than the hardness of the pawls 701. Such materials may include tungsten carbide, cobalt, titanium dioxide, diamond and silicon dioxide. Similar lining may be formed over one or more of the spacers, over an interior surface of the first rotor plate, over an interior surface of the second rotor plate, or combinations thereof. Powder coating or vapor deposition may be used to form the lining. When formed on the pawls, a dip method may be used.

Figure 7B:
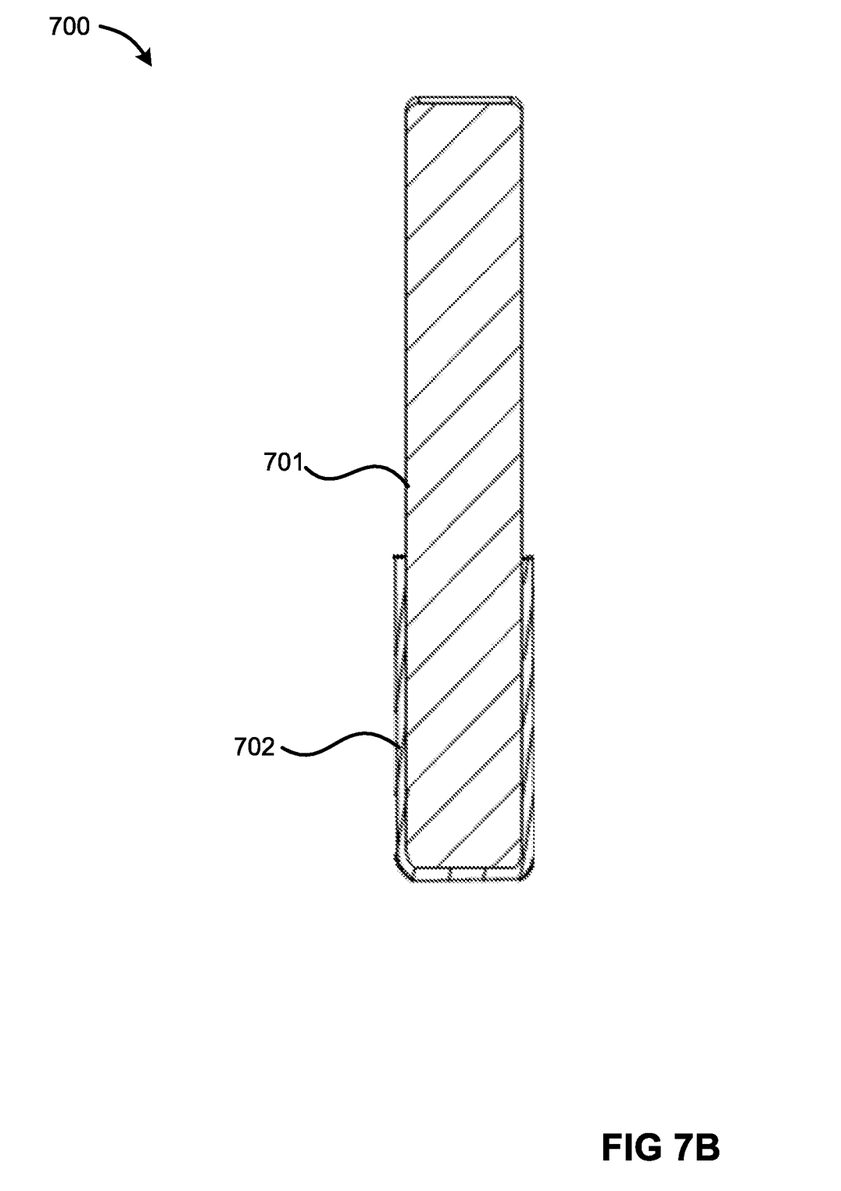
FIG. 7B depicts a cross-sectional view of a locking arm embodiment.

FIG. 7B depicts a cross-sectional view of the locking arm embodiment depicted in FIG. 7A. As with FIG. 7A, the locking arm 700 includes pawls 701 with the hardened lining 702 over the pawls 701. The hardened lining has a hardness greater than a hardness of the pawls (or at least one or more of the pawls).

We claim:

1. A parking brake and anti-theft apparatus, comprising:
a brake assembly comprising a brake rotor having a first rotor plate, a second rotor plate, a plurality of spacers between the first and second rotor plates connecting the first and second rotor plates, and a plurality of slots between the spacers;
an actuator; and
a rocker coupled to the actuator and disposed adjacent to the circumference of the brake rotor, the rocker comprising a pivot and at least two pawls, each pawl disposed on an opposite side of the pivot from the other pawl, and each pawl corresponding to at least one of the plurality of slots, wherein, in a locked configuration, the pawls are inserted into the slots between the first and second rotor plates, and wherein, in an unlocked configuration, the pawls are disposed outside the slots, wherein the actuator moves the rocker between the locked and unlocked configurations by adjusting a position of the rocker relative to the brake rotor.

2. The parking brake and anti-theft apparatus of claim 1, further comprising a hardened lining over one or more of the pawls, over one or more of the spacers, over an interior surface of the first rotor plate, over an interior surface of the second rotor plate, or combinations thereof.

3. The parking brake and anti-theft apparatus of claim 2, wherein the hardened lining comprises one or more of tungsten carbide, cobalt, titanium dioxide, diamond, and silicon dioxide.

4. The parking brake and anti-theft apparatus of claim 2, wherein the hardened lining has a hardness greater than a hardness of one or more of the pawls, one or more of the spacers, the interior surface of the first rotor plate, the interior surface of the second rotor plate, or combinations thereof.

5. The parking brake and anti-theft apparatus of claim 1, wherein the actuator is coupled to the rocker at the pivot.

6. The parking brake and anti-theft apparatus of claim 1, wherein the actuator comprises one or more of a solenoid, a spring, a hydraulic pump, a pneumatic pump, a motor, a screw, a cam and a wedge.

7. The parking brake and anti-theft apparatus of claim 1, wherein the pawls each comprise a shape complementary to the corresponding slots.

8. The parking brake and anti-theft apparatus of claim 1, wherein the apparatus is installed on a vehicle, and wherein an electronic control unit (ECU) of the vehicle signals the actuator to move the rocker to the unlocked configuration as the ECU detects authorized use of the vehicle.

9. The parking brake and anti-theft apparatus of claim 1, further comprising a position sensor coupled to one or more of the actuator and the rocker, wherein the position sensor detects a position of the rocker relative to the actuator, the brake rotor, or both.

10. The parking brake and anti-theft apparatus of claim 9, wherein the apparatus is installed on a vehicle, and wherein an electronic control unit (ECU) of the vehicle stores and executes instructions to cause rotation of the brake rotor to align the pawls with the corresponding slots based on a position of the rocker detected by the position sensor.

* * * * *